RADIATION-SENSITIVE SEMI-CONDUCTOR DEVICE HAVING A SUBSTANTIALLY LINEAR CURRENT-VOLTAGE CHARACTERISTIC

Filed July 1, 1963 4 Sheets-Sheet 1

INVENTORS
FREDERIK H. STIELTJES
GESINUS DIEMER
LEOPOLD HEIJNE
BY Frank R. Trifari
AGENT INVENTORS
FREDERIK H. STIELTJES
GESINUS DIEMER
LEOPOLD HEIJNE
BY
Frank R. Trifari
AGENT

INVENTORS
FREDERIK H. STIELTJES
GESINUS DIEMER
BY LEOPOLD HEIJNE

Frank R. Trifari
AGENT

INVENTORS
FREDERIK H.STIELTJES.
GESINUS DIEMER.
LEOPOLD HEIJNE.
BY
Frank R. Trifari
AGENT United States Patent Office 3,324,297
Patented June 6, 1967

3,324,297
RADIATION-SENSITIVE SEMI-CONDUCTOR DEVICE HAVING A SUBSTANTIALLY LINEAR CURRENT-VOLTAGE CHARACTERISTIC

Frederik Hendrik Stieltjes, Gesinus Diemer, and Leopold Heijne, Emmasingel, Eindhoven, Netherlands, assignors to North American Philips Company, Inc., New York, N.Y., a corporation of Delaware
Filed July 1, 1963, Ser. No. 291,900
Claims priority, application Netherlands, July 2, 1962, 280,435
20 Claims. (Cl. 250—211)

The invention relates to a photo-sensitive semi-conductor device comprising a photo-sensitive circuit element having a photo-sensitive body, in which by means of a supply source included in an external circuit potentials are applied to at least two electrodes in contact with the body and in which a current path is formed in the body, the impedance variation of which in accordance with the incident radiation is employed in the external circuit. The invention furthermore relates to particular embodiments of a photo-sensitive circuit element having a photo-sensitive body suitable for use in such a photo-sensitive semi-conductor device.

Such photo-sensitive semi-conductor devices are employed inter alia for the detection or the measurement of radiation energy of electromagnetic or corpuscular nature or as radiation-sensitive switches, for example in monitoring systems. At the incidence of radiation on the photo-sensitive body a decrease in impedance occurs between the electrodes, so that an increase in current is obtained in an external load circuit including said impedance via electrodes in conjunction with a voltage source, which current increase may be utilized, e.g. measured or fed to a further circuit element. A further important use lies in the field of the so-called opto-electronic systems in which a photo-sensitive body and an electro-luminescent body are coupled optically and/or electrically, so that they may be operative as an electric amplifier, a radiation or image intensifier or as a multistable switch.

With all these uses it is often important that a high energy amplification should be obtainable without the need for using very high voltage differences between the electrodes and of the consequent use of a large-sized body. With many further uses it is, moreover, desirable for the value of the impedance, in general, of the resistance upon radiation and in the absence of radiation (the so-called dark resistance) and for the corresponding values of the current intensities in the external circuit to be clearly distinguishable. The energy amplification G of such a device is to denote herein, as usual, the electric power obtainable between the electrodes per unit of incident radiation power, which power can be expressed as follows in a formula:

$$G=\eta\cdot\left(\frac{\tau}{t_r}\right)\cdot\left(\frac{V}{V_r}\right)$$

wherein $\eta$ is a proportionality constant relating to the efficiency of the excitation process and $\tau$ the mean lifetime in seconds of the free charge carriers in the body between the electrodes, $t_r$ is the mean transit time of the free charge carriers in seconds between the electrodes, V is the voltage applied between the electrodes in volts and $V_r$ is the energy required for releasing a charge carrier in electron-volts, divided by the electron-charge in Coulombs.

In the known photo-sensitive semi-conductor devices of the kind set forth the circuit element is often formed by a so-called photo-resistor having a photo-conducting body usually made of a semi-conductor material, e.g. CdS or CdSe, in which the electrical conduction is provided substantially only by electrons. At a short distance from each other two ohmic electrodes are arranged on the body, between which electrodes a voltage difference is applied. Since the electrons can be readily supplied and conducted away via the ohmic electrodes, such a photo-resistor permits of causing a number of charge carriers substantially equal to the product of the number of free electrons excited by the radiation per second and of their lifetime $\tau$ to take effective part in the conduction process. As a consequence of the long lifetime $\tau$, the distance between the electrodes may be chosen, without any difficulty, to be so small that with the field intensity produced by the applied voltage the transit time $t_r$ of the electrons between the electrodes is much shorter, for example a factor of $10^4$ shorter, than the lifetime $\tau$. Consequently, these photo-resistors permit of attaining a high energy amplification G with a comparatively low voltage V, since in accordance with the formula given above the factor $(\tau/t_r)$, which, in fact, represents the current amplification factor, may be high. However, an inherent disadvantage of these photo-resistors consists in that the high energy amplification is attained with the given, comparatively slow mobility of the charge carriers in the semi-conductors concerned due to the long lifetime $\tau$ of one of the two types of charge carriers. This restricts the choice of the material to those semi-conductors which have said property and owing to the length of the lifetime $\tau$ these photo-resistors exhibit a great inertia in switching the radiation on and off. With CdS and CdSe for example the switching times vary between 10 secs. and 0.01 sec. the amplification factor G being proportionally lower with the shorter switching times.

Apart from photo-resistors the circuit elements of the known photo-sensitive semi-conductor devices have been formed by photo-diodes and photo-transistors comprising a semi-conductor body e.g. of germanium or silicon, in which the contributions of electrons and holes to the conduction are of the same order of magnitude. With such a photo-diode the semi-conductor body as a pn- or p-i-n-structure. Ohmic contacts are provided on the n- and the p-zones and, in operation, the contact of the p-region receives across the external circuit a negative voltage relative to the n-region, so that the junction is driven in the reverse direction. In the case of a p-i-n-structure with the known photo-diode the distance between the electrodes is at the most a few diffusion-recombination lengths. The dark conduction may be kept low in this case, as with the photo-resistor, but with the photo-diodes of this kind the number of charge carriers taking additionally part in the conduction process upon radiation between the electrodes can practically not exceed the number excited per second, since in contrast to the photo-resistor, no holes or electrons can be supplied from the n-region and the p-region respectively with this photo-diode. Owing to these difficulties in the supply a non-linear relationship in the current-voltage characteristic curve appears already with a comparatively low voltage difference in the reverse direction, which corresponds with the depletion of the supply of charge carriers from the semi-conductor region. Thus the energy amplification remains restricted to the second factor $(V/V_r)$, which indicates the voltage amplification, since the factor $(\tau/t_r)$ can practically not exceed unity due to said supply difficulties. Although the materials usually employed for photo-diodes e.g. germanium or silicon, permit of attaining higher switching speeds, there is involved the disadvantage of the said non-linear relationship in the current-voltage characteristic curve, while due to the absence of current amplification the energy amplification is comparatively low, unless very high voltage differences V, for example of the order of tens of kilovolts were employed, which would necessarily imply much larger dimensions of the body. A recent publication suggests a new type of photo-diode exhibiting high sensitivity based on the principle of diffusion length modulation. While in this diode a single junction is used and forward biased, the structure still exhibits very poor linearity of current-voltage characteristic. Moreover, over a substantial part of the current-voltage characteristic the conductivity is essentially due to one single type of charge carriers.

Apart from the photo-diode, a photo-transistor is used as a circuit element in the known semi-conductor devices, said transistor having, as is known, a p-n-p- or an n-p-n-structure, a voltage difference being applied between the two external zones of the same conductivity type. The operation of the photo-transistor is based on the combination effect of said structure as a photo-diode and as a normal transistor amplifier, which amplifies electrically the photo-diode signal. Since the high energy amplification factor is due, for an important part, to the normal transistor amplification effect, a correct proportioning of the structure of the transistor amplifier part is required for a satisfactory operation of the photo-transistor. However, the requirements for a satisfactory transistor effect, e.g. a thin base zone and a short distance between the two outer layers, preferably in opposite positions, adversely affect a satisfactory photo-diode operation, since due to the thin intermediate layer and to the screening effect of the outer layers and/or of the contacts provided thereon the sensitive surface available for irradiation is very small. These requirements with respect to proportioning constitute in practice a serious drawback of the photo-transistor.

The invention has for its object inter alia to provide a novel, particularly efficacious embodiment of a photo-sensitive semi-conductor device which, in contrast to the known photo-resistors, permits of employing semi-conductor materials in which the contribution to conduction of the two types of charge carriers may be practically the same, while nevertheless the said disadvantage inherent in the known photo-diode and the known photo-transistor using said kind of semi-conductor materials are wholly or partly avoided and the switching inertia may be considerably lower than with the known photo-resistors and the surface available for irradiation may be simply accessible and comparatively large. The invention has furthermore for its object to provide particular, preferred embodiments of such a photo-sensitive semi-conductor device and particular embodiments of a photo-sensitive circuit element having a photo-sensitive body suitable for use therein.

With a photo-sensitive semi-conductor device of the kind set forth the photo-sensitive circuit element comprises, in accordance with the invention, a photo-sensitive body having a practically intrinsic or weakly extrinsic semi-conductor region in which, upon irradiation, the hole conduction and the electron conduction are substantially of the same order of magnitude, and at least two electrodes, separated by said region, for the current supply to the body, one electrode being capable of injecting mainly only electrons and the other electrode being capable of injecting mainly only holes into the said intermediate region, while by means of at least one external supply source, via the electrodes, a voltage difference is applied to said intermediate region so that the said injecting electrodes are driven, at least temporarily, in the forward direction and the holes and electrons pass, at least locally in the intermediate region, through a substantially common current path, the impedance of which is affected by the radiation incident to the said intermediate region.

The terms "practically intrinsic," "weakly extrinsic," "electrode" and "of the same order of magnitude" will be explained more fully hereinafter in the description of the figures.

The practically intrinsic or weakly extrinsic semi-conductor region comprising the impedance to be affected in accordance with the incident radiation is readly accessible to the radiation in a semi-conductor device according to the invention and the dimensions of said region are not at all so critical as with the known photo-transistor. The provision of a specifically electron-injecting electrode and a specifically hole-injecting electrode on the intrinsic or weakly extrinsic intermediate region allows a simple supply of electrons and holes to the intermediate region. With respect to the known photo-diode, in which said supply via the blocked electrodes is practically excluded, the device according to the invention has the advantage that no depletion of the supply occurs, so that the current-voltage characteristic curve remains substantially linear up to much greater voltage differences. As compared with the known CdS- or CdSe-photo-resistor the device according to the invention is distinguished in particular in that in the intermediate region mainly determining the impedance use is made of a semi-conductor in which the conduction contributions of the two types of charge carriers are practically of the same order of magnitude, while for the two charge carriers the supply is ensured on the one hand by the hole-injecting electrode and on the other hand by the electron-injecting electrode. It is thus at the same time possible to use semi-conductor materials having a low lifetime $\tau$ so that shorter switching periods, i.e. higher switching rates, than with the known photo-resistors can be attained. Like with the known photo-resistor and in contrast to the known photo-diode current amplification and hence, with comparatively low voltage differences, a high energy amplification can be obtained by applying an adequately high field intensity via the electrodes to the current path determining the impedance.

With a preferred device embodying the invention current amplification is obtained by applying via the electrodes to the intermediate region such a high voltage difference that the mean transit time of the charge carriers required to cross the current path in the intermediate region is shorter than the mean recombination lifetime of said charge carriers in the intermediate region. The occurrence of current amplification will be explained more fully hereinafter in the description of the drawing.

In a simple, suitable further semi-conductor device embodying the invention the photo-sensitive body has a p-i-n- or a p-s-n-structure, in which the p-zone and the n-zone with the associated contracts constitute the said injecting electrodes, while the common current path lies in the intrinsic (i) or in the weakly extrinsic (s) semi-conductor intermediate region to which the radiation is incident, between said electrodes, while in the external circuit between said electrodes a voltage difference is applied, at least temporarily, so that the hole-injecting electrode receives a positive voltage with respect to the electron-injecting electrode. When a voltage difference is applied in the said direction, the two electrodes are driven in the forward direction with respect to the intermediate region (s; i), an efficaceous injection of electrons and holes being thus possible.

By obviating the hindrance of the supply of electrons and holes, the p-s-n- or the p-i-n-structure as described above provide an important improvement as compared with the known photo-diode in various respects, for example in the linearity of the current-voltage characteristic curve and the current amplification, so that it may be employed with great advantage in those cases in which said properties are particularly interesting.

In the aforesaid embodiment an efficient supply of the two types of charge carriers is ensured, but a further improvement may be obtained in the collection of said charge carriers. Whereas the favourable conditions of supply of electrons and holes and hence the possibility of realizing one or more of the advantages described above are maintained, an improved collection may be obtained in a further preferred semi-conductor device embodying the invention by providing the said intrinsic or weakly extrinsic intermediate region in the proximity of at least one of the said injecting electrodes with at least one separate collecting electrode, which conducts away from the common current path charge carriers of the type opposite the type of charge carriers injected by the relevant injecting electrode. Such a semi-conductor device is preferably constructed so that it comprises a photo-sensitive body having a practically intrinsic or weakly extrinsic semi-conductor region and at least two pairs of electrodes, separated from each other by said region, one pair having an electrode injecting mainly only electrons and a separate hole-collecting electrode and the other pair having an electrode injecting mainly only holes and a separate electron-collecting electrode. With this preferred embodiment of the invention the addition of a separate collecting electrode to one or to both injecting electrodes causes the collecting function of the injecting electrode to be taken over at least partly by said separate electrode, which differs to this end from the injecting electrode so that it has an improved collecting capacity for the relevant charge carriers. The expression "holes" and "electrons" collecting electrode has to be understood in such a broad sense that it comprises a separate electrode having an improved collecting capacity of the relevant charge carriers with respect to the injecting electrode along which said carriers are to be conducted away in the first-mentioned embodiment. The collecting electrodes are preferably formed by electrodes capable of collecting mainly only the charge carriers of the relevant type. Thus, in one or in each pair of electrodes the injecting function and the collecting function are joined each to one electrode specifically suitable for said function, so that it may be proportioned to this end in an optimum manner. Although it is possible to obtain in a different, known way specifically hole- or electron-collecting or- injecting electrodes, the hole-injecting electrode and the hole-collecting electrode are preferably formed each by a p-conducting zone with the associated contact and the electron-injecting electrode and the electron-collecting electrode are formed each by an n-conducting zone with the associated contact, while the electrodes concerned are driven for injection in the forward direction and for collection in the reverse direction with respect to the intermediate region.

An important advantage of said embodiment comprising two separate electrode functions in one and preferably in both pairs consists in that as compared with the aforesaid p-i-n- or p-s-n-structure a lower dark current is attainable with the same length of the current path in the intrinsic region between the electrodes. Owing to the improvement in the collection it is possible, particularly with a low operational voltage, to reduce voltage losses in the junctions between the electrodes and the intermediate region.

In order to obtain an optimum performance of the collecting function, the radiation is preferably directed not only to the intermediate region but also to the zones associated with the electrodes, whilst a further measure is taken to obtain between the injecting electrode and the collecting electrode of each pair a voltage difference in the external circuit, said difference having the same polarity as the floating potential difference occurring upon radiation impinging on the body between the two electrodes, the value of said difference lying between half the floating voltage difference and the band gap of the intermediate region, said difference being preferably substantially equal to said floating potential. Between the two groups of electrodes, in the intrinsic or weakly extrinsic conducting intermediate region, there is the common current path for holes and electrons, which path determines the impedance to be acted upon by the radiation. In order to cause the holes and the electrons to pass through the current path in one direction and in the opposite direction respectively and in order to ensure a satisfactory supply and collection, the injecting electrode and the collecting electrode of each pair, i.e. their associated zones, if any, are spaced apart by a maximum distance of five diffusion-recombination lengths, preferably by a maximum distance of three diffusion-recombination lengths. A diffusion-recombination length is to be understood herein, as usual, the distance over which an additional concentration of the two types of charge carriers, produced locally in said material, flowing off towards other parts by diffusion and recombination drops to $1/e$ of its value, wherein $e$ designates the Neper number (2.718).

The general requirements for a photo-sensitive circuit element suitable for use in a semi-conductor device according to the invention are mentioned above with reference to the semi-conductor device. The invention further relates not only to the semi-conductor device comprising such a circuit element but also to particular embodiments of the circuit element itself suitable for use in such a device, as will appear hereinafter.

The photo-sensitive elements according to the invention comprise furthermore, as is usual for a photo-sensitive circuit element, means for admitting the radiation to the photo-sensitive body, for example a radiation-permeable wall of an envelope. The radiation is caused to strike, in the present case, the practically intrinsic or weakly extrinsic region and preferably, in addition, the zones of the photo-sensitive body associated with the electrodes.

The photo-sensitive semi-conductor device according to the invention and the photo-sensitive circuit element according to the invention and further particular embodiments thereof and the particular advantages thus obtainable will now be described more fully with reference to a number of figures and embodiments.

Figure 1:
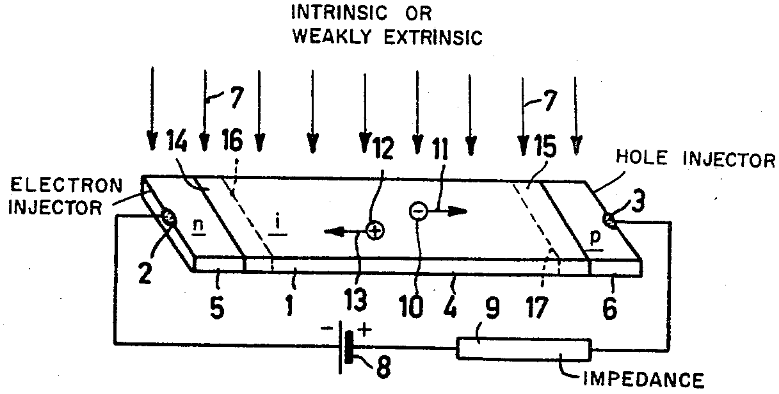
FIG. 1 shows diagrammatically in a perspective view a preferred photo-sensitive device and a photo-sensitive circuit element embodying the invention.

With a photo-sensitive semi-conductor device according to the invention of the kind shown in FIG. 1 the photo-sensitive circuit element comprises a photo-sensitive body 1, which may have the shape of a strip, provided at the ends with contacts 2 and 3. The photo-sensitive strip 1 comprises a practically intrinsic or weakly extrinsic semi-conductor region 4, which terminates at one end of the strip in an n-conducting zone 5 and at the other end in a p-conducting zone 6. The n-conducting zone 5 together with the contact 2 provided thereon, constitutes an electrode (2, 5), which is capable of injecting substantially only electrons into the intermediate region 4, since the hole concentration in said zone 5 is materially lower. The p-conducting zone 6, together with the contact 3, provided thereon, constitutes an electrode (3, 6), which is capable of injecting substantially only holes into the intermediate region 4, since the electron concentration in said zone 6 is much lower than the hole concentration. According as the conductivity of the n-conducting zone 5 and of the p-conducting zone 6 is higher with respect to the intermediate region 4, the injection of electrons or holes respectively into the intermediate region is higher. The junctions between the n 5 and p 6 zones and the i or s region 4 are asymmetrically-conducting. The radiation 7 is incident to the intermediate region 4 at right angles to the broad side of the strip 1 and preferably in addition to the electrode zones 5 and 6, which may thus have a higher conductivity, which means a reduction of resistance in the supply paths.

Via an external voltage source 8 a negative voltage with respect to the hole-injecting electrode (3, 6) is applied to the electron-injecting electrode (2, 5) in the external circuit in series with an impedance 9, which may be a current or voltage meter or an impedance, for example a resistor of a further circuit element or an element from which the voltage is fed to the further arrangement, so that the two electrodes are driven in the forward direction with respect to the intermediate region 4, so that they are injecting. Apart from further differences to be referred to hereinafter in the preferred embodiment of the photo-sensitive circuit element itself, there appears now an essential difference between a semi-conductor device according to the invention and the known semi-conductor device comprising a photo-diode, in which, in contrast to the present device, the two electrodes (2, 5) and (3, 6) are driven in the reverse direction, so that the supply of electrons and holes from said electrodes is practically excluded, which involves the said disadvantages.

In the device shown in FIG. 1 a voltage difference is applied via the electrodes (2, 5) and (3, 6) to the intermediate region 4 and the electrons 10 and the holes 12 injected by the electrodes and released by the radiation traverse a substantially common current path in the intermediate region 4 in a manner such that the electrons 10 pass through said current path in the direction of the arrow 11 and the holes 12 pass through said current path in the opposite direction indicated by the arrow 13. This common current path in the practically intrinsic or weakly extrinsic region 4 determines at least mainly the impedance to be affected in accordance with the incident radiation intensity between the electrodes (2, 5) and (3, 6), to which end the resistance losses in the supply paths in and near the electrodes are minimized.

In the intermediate region 4 the electrons and holes have a mean lifetime $\tau$ which depends upon the semi-conductor material chosen and upon the incorporated or available concentration of recombination centres. If $g$ designates the number of electrons and holes released per second by the radiation, a number of $g\tau$ charge carriers with the given radiation can take part, in addition, in the conduction process, provided said number is not depleted by collection without supply via the electrodes, which is the case with the known blocked diode. With the device according to the invention this depletion is just avoided by the ready supply of electrons and holes via the electrodes (2, 5) and (3, 6) respectively. This implies that the electro-neutrality in the intermediate region (4) is maintained. On the other hand in the absence of either a hole or an electron injector, an excess of one type of charge carriers would establish a space charge, and thus the current would become space charge limited and saturated, as is in the known diodes. Thus between the electrodes (2, 5) and (3, 6) a current-voltage characteristic curve is obtained which remains substantially linear up to much higher voltage differences than with the known photo-diode: where non-linearity is undesirable this is advantageous.

A further important advantages of a photo-sensitive semi-conductor device according to the invention, for example of the embodiment shown in FIG. 1 and of the embodiment shown in FIG. 2 to be described later, consists in that current amplification and hence an additionally high energy amplification can be realized. With a preferred embodiment of a semi-conductor device according to the invention a potential difference is applied via the electrodes to the intermediate region (4), thus such a high field intensity being produced across the common current path that the mean transit time of the charge carriers required to cross the intermediate region 4 of FIG. 1 between the electrodes (2, 5) and (3, 6) is shorter than the mean recombination lifetime $\tau$ of said charge carriers in the intermediate region 4. If it is assumed that the mean transit time of a charge carrier from one zone, for example 5, to the other zone, for example 6, is $t_r$, each charge carrier will cross $1/t_r$ times per second. This means that with a semi-conductor device according to the invention $g\cdot\tau/t_r$ times per second a charge carrier is transported between said electrodes or in other terms, that $$g\cdot\left(\frac{\tau}{t_r}\right)$$

of charge carriers take effectively part in the conduction. If therefore $\tau/t_r$ exceeds 1, a number of charge carriers can flow in the external circuit(s) connected to the electrodes per second which number is $(\tau/t_r)$—times the number $g$ released by the radiation per second, or in other words, a current amplification factor $\tau/t_r$ exceeding unity is obtained. Owing to the satisfactory supply via the electrodes (2, 5) and (3, 6), a number of charge carriers $g\cdot\tau$ in the intermediate region is maintained, even if the transit time $t_r$ is shorter than the lifetime $\tau$. According as the field intensity produced by the applied voltage difference is greater, the shorter will be the mean transit time of the charge carriers and the higher may be the current amplification factor. With an adequately high field intensity it may be for example 100 in a given case.

The absolute magnitude of the potentials at the electrodes to be chosen for a given case depends inter alia upon the thickness of the intermediate region 4, measured along the average current path between the electrodes (2, 5) and (3, 6), upon the magnitude of the mobility and the lifetime of the charge carriers in the relevant semi-conductor material, upon the voltage losses across the supply paths via the electrodes (2, 5) and (3, 6), and upon the desired value of the current amplification factor. It will be obvious that with each thickness to be chosen the aforesaid condition of current amplification can be fulfilled by choosing a sufficiently high voltage difference to be applied to the intermediate region. In order to obtain a high amplification factor particularly in those cases wherein the distance between the electrodes (2, 5) and (3, 6), measured along the current path in the intermediate region, amounts to one or more diffusion-recombination lengths, the potential difference across the intermediate region 4 and hence the field intensity in the common current path must be chosen so high that the mean distance covered by the charge carriers within their mean recombination lifetime $\tau$ under the action of the field is greater than the relevant number of diffusion-recombination lengths or in other words, since with diffusion a voltage drop of $kT/q$, wherein $k$ Boltzmann's constant, T the temperature in degrees Kelvin and $q$ the elementary electron charge, occurs over one diffusion-recombination length, a potential difference exceeding $kT/q$ must be applied to the intermediate region for each diffusion-recombination length, said difference being at least so many times higher as is required to cover the overall distance between the electrodes within the mean lifetime.

The semi-conductor material of the semi-conductor body or at least of the intermediate region 4 is a material in which both the hole conduction and the electron conduction are practically of the same order of magnitude; for example an elementary semi-conductor such as germanium or silicon or a semi-conductor compound such as an $A_{III}B_V$-compound, i.e. a compound of an element of the third column and an element of the fifth column of the Periodical System in equimolecular quantities, for example InSb or GaAs. The term "practically of the same order of magnitude" is to be understood to mean herein that upon radiation the contributions to conduction, determined by the product of concentration and mobility of free holes and free electrons, may differ from each other by not more than a factor 20, preferably by less than a factor 10. The choice of the semi-conductor material depends inter alia upon the desired radiation sensitivity. Germanium and InSb for example are sensitive in the infrared region, whereas semi-conductors having a larger distance between the bands have, as is known, a radiation sensitivity displaced farther towards the short-wave infrared or towards the visible region. The present invention provides therefore the possibility of using semi-conductor materials in which, in contrast to CdS or CdSe, the holes and the electrons contribute to the conductivity practically to the same order of magnitude, in a photo-sensitive semi-conductor device, while nevertheless the same advantages as those of the known CdS and CdSe photo-resistors can be obtained. Since these semi-conductor materials may have, both for holes and electrons, a materially higher mobility than in CdS or in CdSe with a short lifetime $\tau$ of the charge carriers, there is furthermore the possibility of attaining a high energy amplification with short switching times.

The region 4 between the electrodes (2, 5) and (3, 6), comprising the common current path for electrons and holes consists of a substantially intrinsic or weakly extrinsic semi-conductor. A practically intrinsic semi-conductor region is to be understood herein to mean a semi-conductor region in which, in the absence of radiation, the concentrations of free electrons and free holes are substantially equal, so that this expression includes not only a semi-conductor in a highly pure state but also a semi-conductor in which the number of donor centres and the number of acceptor centres compensate each other substantially. Instead of intrinsic semi-conductor material a weakly extrinsic semi-conductor material may be used, although the deviation from the intrinsic conduction is, in general, reduced to such a small value as is possible with a view to the manufacture of the semi-conductor concerned. The extent of said deviation depends inter alia upon the semi-conductor employed, upon the required dark resistance, upon the range of the radiation energy to be detected, upon the required sensitivity and so on. With semi-conductors having a larger band distance, for example, a greater deviation is, in general, permissible with a view to the requirements for the dark resistance. As compared with the numbers of free charge carriers to be released by the radiation, the difference between the numbers of free electrons and free holes in the semi-conductor region, in the absence of radiation, will preferably not be chosen too high, in order to avoid an excessively high asymmetry of the electron conduction and the hole conduction. In practice, it can be assessed for each case by simple experiments to what extent the deviation from the intrinsic conduction is permissible and the expression "weakly extrinsic" must therefore be taken in such a broad sense that, even if a minimum deviation is aimed at, it includes also those cases in which use in a photo-sensitive semi-conductor device according to the invention with one or more of the inherent advantages is possible. In practice, in the case of a weakly extrinsic semi-conductor material, use will preferably be made of a material which includes, in the absence of radiation and at the operational temperature, a number of the predominant charge carriers which does not exceed $10^{15}$ per cm.$^3$, preferably at the most $10^{13}$ per cm.$^3$. With a material having a small band gap such a low number may be attained, for example, also by using a low operational temperature, for example by cooling.

The term "electrodes" are to denote herein not only the metal contacts (2 and 3), but also the associated semi-conductor zones, if any, (5, and 6 respectively), which fulfil the specific function (injection of electrons and holes) of the electrodes. In many cases the electrodes (2, 5) and (3, 6) injecting mainly only electrons and holes respectively will be formed by a metal contact 2 and 3 respectively with the associated n- and p-conducting zones 5 and 6 respectively, which are polarized in the forward direction by means of a voltage source 8 in the external circuit. In order to obtain a satisfactory injection, the extrinsic conductivity in the intermediate region 4 must in these cases be lower than the conductivity of the electrode zones 5 and 6, preferably a factor of at least 100 times lower in the absence of radiation. Within the scope of the invention it is, however, also possible to use other kinds of electrodes capable of carrying out the said functions, for example a metal contact with relevant zone of a semi-conductor material other than that of the intermediate region 4, for example of a semi-conductor material having a larger band distance or an electrode consisting only of a metal and forming a metal-semi-conductor junction with the intermediate region, said junction carrying out directly the function concerned. The contacts may be arranged directly on the body, for example on the associated semi-conductor zones, or they may be electrically insulated from the body so that they constitute a capacitative connection to the associated electrode zones of the body, which may sometimes be desirable in alternating-current operation.

The p-s-n- or the p-i-n-structure of FIG. 1 is particularly suitable for use in conjunction with a direct-voltage source 8 in the external circuit, in which source 8 polarizes continuously the two electrodes (2, 5) and (3, 6) in the forward direction. As an alternative, use may be made of a supply source 8 providing pulses in the forward direction, or of an alternating-voltage source, in which case the particular advantages of the semi-conductor device according to the invention are obtained in the half periods of the alternating voltage corresponding to the forward direction.

Despite the fact that with the simple embodiment of FIG. 1 having a p-i-n- or a p-s-n-structure the two electrode zones 5 and 6 are polarized in the forward direction, it is nevertheless possible, owing to the presence of the practically intrinsic or weakly extrinsic intermediate region 4, to obtain a distinction between the dark current flowing in the absence of radiation and the radiation current produced upon radiation, which distinction suffices for many uses. For use in the radiation measuring field, for example, the value of the dark current is otherwise of little importance, since it can be eliminated in a simple, known manner by means of a bridge circuit. The dark current may be reduced at will by choosing the cross-section of the current path in the intermediate region 4 to be small by using a semi-conductor having a large band gap and by using a large distance between the electrodes measured along the current path in the intermediate region. Thus very thin strips or layers may be used, the thickness of which is approximately of the order of magnitude of a few absorption lengths of the relevant radiation in the semi-conductor concerned. In the absence of radiation the electrodes (2, 5) and (3, 6) can nevertheless inject electrons and holes respectively into the portions of the intermediate region adjacent said electrodes. The dark current may be kept low by avoiding coincidence of said portions 14 and 15, in which the electrons and the holes have a great concentration and which extend over a distance of a few diffusion-recombination lengths from the electrodes (2, 5) and (3, 6) (in FIG. 1 the boundary of said portions is indicated by way of example by the broken lines 16 and 17 respectively). Therefore, with a photo-sensitive semi-conductor device and with a photo-sensitive circuit element of the invention having the structure shown in FIG. 1, the distance between the two injecting electrodes (2, 5) and (3, 6), particularly with a p-i-n- or p-s-n-structure as shown in FIG. 1, measured along the current path in the intermediate region 4, is chosen to be at least five diffusion-recombination lengths, preferably at least ten diffusion-recombination lengths.

With a structure having only two electrodes (2, 5) and (3, 6) as in the embodiment shown in FIG. 1, the electrons must be conducted away towards the hole-injecting electrode (3, 6) and the holes must be conducted to the electron-injecting electrode (2, 5). In general, it applies that an electrode specifically intended for the injection of charge carriers of a given type, for example a p-type electrode intended for the injection of holes, is less suitable for collecting charge carriers of the opposite type, for example electrons, i.e. for conducting them away, since the concentration of the charge carriers of the opposite type in this electrode is small. The flow of charge carriers to be conducted away, for example the flow of electrons, must therefore first be converted into a flow of charge carriers of the opposite type, for example a flow of holes by recombination, so that additional losses owing to potential jumps may occur in the current supply parts and portions 14 and 15 of the intermediate region 4 adjacent thereto, which losses should be avoided as far as possible. These losses are counteracted by a compensation, since by the injection the operative length of the intermediate region decreases, which involves, however, an increase in dark current. With an embodiment having only two electrodes as shown in FIG. 1 the said voltage losses may be reduced in accordance with the invention by joining to the intermediate region the injecting electrodes, i.e. in the embodiment shown in FIG. 1, the electrode zones 5 and 6 via transistion layers 14 and 15, which have, with respect to the further part of the intermediate region 4, a higher concentration of recombination centres for the charge carriers of the relevant type to be collected. It is thus possible to provide a recombination over a short path, in the electrode zones or as an intermediate layer between the electrode zone and the high resistivity region. The concentration of fast recombination centres may be of the order of $10^{14}$ to $10^{16}$/cm.$^3$, and may be for instance copper.

As described in the preamble in general terms, the collection may be improved in a further, particularly suitable and preferred embodiment of the invention by joining to one or to both injecting electrodes one or more separate collecting electrodes. FIG. 2 shows by way of example such a preferred embodiment in a diagrammatic, perspective view. In this embodiment the intrinsic or weakly extrinsic intermediate region 4 separates two pairs of electrodes, i.e. one pair (2, 5) and (20, 21) and one pair (3, 6) and (22, 23) from each other. One pair comprises a specifically electron-injecting electrode (2, 5), preferably formed by a contact 2, and the n-type zone 5 and a separate hole-collecting electrode (20, 21), which is preferably formed by an electrode which is capable of collecting mainly only holes, said electrode consisting for example of a contact 20 and a p-type zone 21. The other pair comprises a specifically hole-injecting electrode (3, 6), which is preferably formed by a contact 3 and the p-type zone 6 an a separate electron-collecting electrode (22, 23), formed preferably by an electrode which is capable of collecting mainly only electrons, to which end it may be effectively formed by a contact 22 and the associated n-conducting electrode zone. If in the external circuit these electrodes receive potentials in accordance with their function, so that the injecting electrodes are driven in the foward direction and the collecting electrodes are driven in the reverse direction, and if at the same time a voltage difference is maintained across the intermediate region 4, the electrons 10 traverse in the direction of the arrow 11 and the holes 12 in the direction of the arrow 13 in the intermediate region 4, at least at a given distance from the electrodes, a substantially common current path, which is indicated by way of example by the broken line 24 and for a hole by the broken line 24'. Near the electrodes the current paths of the electrons and the holes are separated from each other. Thus on one side the electrode (2, 5) feeds electrons to the intermediate region and holes are conducted away by the electrode (20, 21), whereas on the other side holes are fed by the electrode (3, 6) and electrons are conducted away by the electrode (22, 23). Between the two electrode pairs there is the common current path in the intermediate region 4, which path determines mainly the impedance to be acted upon in accordance with the incident radiation.

The radiation to be detected (indicated by the arrows 7) is caused to be incident not only to the intermediate region 4 but preferably also to the proximity of the electrode zones and to the electrode zones themselves (21, 5, 6 and 23). It is thus achieved that also in the electrode zones and in their neighbourhood the conductivity is raised and the voltage losses in the supply paths is reduced.

In order to ensure a particularly advantageous separation between supply and drainage with an electrode pair and to obtain an efficaceous formation of the common current path, the injecting electrode and the collecting electrode, preferably of each pair, are arranged preferably at a distance from each other of at the most five diffusion-recombination lengths, preferably at the most three diffusion-recombination lengths. With the electrode system shown in FIG. 2 this means that the electrode zones 5 and 6 are spaced apart from the electrode zones 21 and 23 respectively by such a distance.

In order to fully utilize the favourable effect of the additional increase in conductivity produced by radiation incident to the neighbourhood of the electrodes of each pair or to said electrodes themselves for improving the supply and collection, a voltage difference is maintained preferably in the external circuit between the injecting electrode and the collecting electrode of each pair, said difference lying between half the floating potential difference and the band gap in volts of the semi-conductor concerned, said difference having the same polarity as said floating voltage difference and being preferably substantially equal to said floating potential difference, which is produced, upon radiation, between the relevant electrodes. The floating potential difference is to denote herein the photo-electromotive force produced between said electrodes without external interconnection. A decrease in voltage difference or a reversal of the polarity adversely affect said additional increase in conductivity, whilst with an increase in said difference in excess of the band distance in volts the advantages of this structure over those of FIG. 1 are less conspicuous. Although the voltage difference is preferably chosen equal to the floating potential difference, it may be desirable in some cases, for example at the appearance of parasitic leakage between the electrodes or series resistances in the electrodes of a pair, to carry out a correction of the deviation from the floating potential difference in the external circuit.

An important advantage of the embodiment described with reference to FIG. 2 with separated injecting electrodes and collecting electrodes consists in that due to the improved collection in some cases lower voltage losses occur in the current supply paths via the electrodes than in the embodiment shown in FIG. 1, while at any rate also the linearity of the current-voltage characteristic can be further improved. Owing to the provision of a satisfactorily collecting electrode in each pair, the concentration of charge carriers in the portions of the intermediate region adjacent the electrodes is kept lower in the absence of radiation so that with respect to the p-s-n- and the p-i-n-structures of FIG. 1 a further important advantage is obtained in that a lower dark current appears with the same distance between the injecting electrodes. The last-mentioned advantage is particularly obtained, if in the external circuit between the electrodes of each group, a voltage difference equal to the floating potential difference or a voltage difference lying within the aforesaid limits is maintained. In the embodiment shown in FIG. 2 therefore a lower dark current is obtainable and/or a shorter distance between the injecting electrode (2, 5) and (3, 6) is permissible than with the embodiment shown in FIG. 1 or in other words with a small size of the photo-sensitive body a lower dark current is obtainable. With a view to the dark current the minimum distance between the two electrode pairs is preferably at least three diffusion-recombination lengths.

Figure 2:
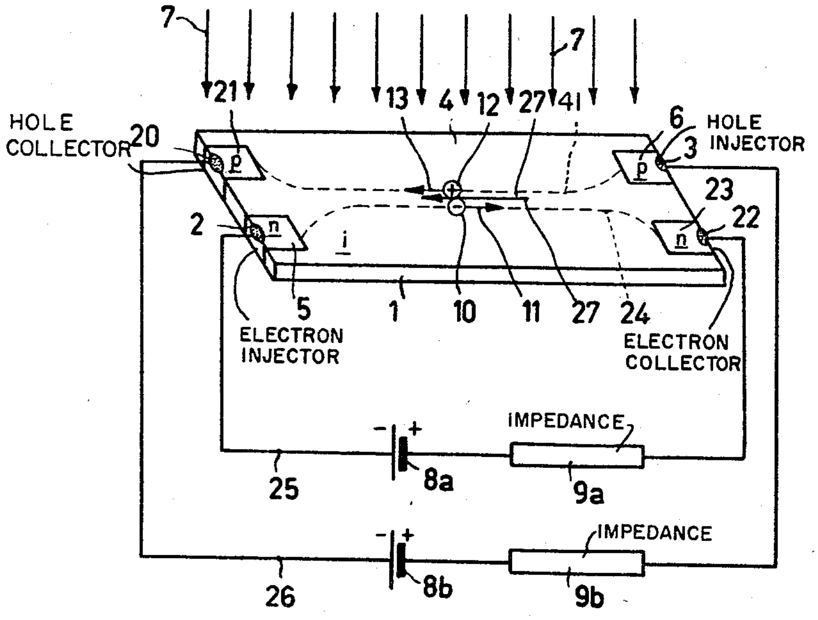
FIG. 2 shows diagrammatically in a perspective view a further preferred photo-sensitive circuit element and a photo-sensitive semi-conductor device embodying the invention.

In the foregoing, different, preferred lower limits for the distance between the injecting electrodes (2, 5) and (3, 6) or, in other words for the thickness of the intermediate region 4, is indicated for the embodiments shown in FIGS. 1 and 2. The upper limit of said distance depends inter alia upon the voltage difference chosen for the external circuit. With a large distance between the electrodes the application of a correspondingly high voltage difference to the intermediate region may yield the same advantages as those obtained with a smaller distance, for example a current amplification factor exceeding unity, by raising the voltage difference across the intermediate region and hence the field intensity in the intermediate region to an extent such that the transit time is shorter than the lifetime $\tau$. According as the distance between the electrodes and the thickness of the intermediate region are smaller, a lower voltage difference may yield a high energy amplification, since the transit time is shorter. The operational voltage may be lower than approximately 300 v.; it is preferably lower than 50 v.

In the embodiment shown in FIG. 2 the injecting and the collecting electrodes, for example (2, 5) and (20, 21), are formed by contacts with the relevant semi-conductor zones 5 and 21 respectively. It should be noted here that similarly to the injecting electrode described with reference to FIG. 1 the two electrodes may be constructed in a different way, for example in the form of a metal-semiconductor junction or a contact with the relevant semiconductor zone having a different band distance (so-called heterojunction). Although use will be preferably be made of an electrode specifically suitable for collecting the relevant charge carriers, for example holes, an improvement in the collection is already obtained if the collecting electrode has an improved collecting power with respect to the injecting electrode to which it is added. This means that within the scope of the invention an ohmic electrode may be used on the intermediate region advantageously for a hole- or electron-collecting electrode, said electrode having an improved collecting power for the relevant charge carriers as compared with the electrode specifically intended for the injection of charge carriers of the opposite type. An electrode having an improved collecting power is to denote herein an electrode which is capable of conducting away a higher flow of charge carriers of the relevant type, when a voltage difference is applied between said electrode and the intermediate region than is the case, under the same conditions, with the injecting electrode to which it is associated.

To the embodiment shown in FIG. 2 the remarks made with reference to FIG. 1 also apply, for example in connection with the obtainment of current amplification, the choice of the semi-conductor material and of the electrodes. In the embodiment shown in FIG. 2 use is made of two pairs of electrodes. If desired, the injecting electrode (2, 5) and/or the collecting electrode (20, 21) may, of course, be subdivided into two or more partial eletcrodes, so that two or more groups of two or more than two electrodes are formed, while the electrodes having the same function can be connected in parallel in each group.

A voltage difference substantially equal to the floating potential difference between the injecting electrode and the collecting electrode of each pair or a voltage difference lying within the limits defined above may be maintained in different ways. FIG. 2 illustrates an arrangement suitable to this end, in which use is made of two external circuits 25 and 26, one circuit 25 with a supply source 8*a* being connected between the electron-injecting electrode (2, 5) of one pair and the electron-collecting electrode (22, 23) of the other pair and the other circuit 26 with a supply source 8*b* which is preferably substantially identical to the first-mentioned supply source 8*a*, being connected between the hole-collecting electrode (20, 21) of one pair and the hole-injecting electrode (3, 6) of the other pair, while said circuits 25 and 26 are coupled with each other via the photo-sensitive body 1. Thus, the floating voltage difference associated with the relevant radiation intensity is automatically adjusted between the two electrodes of each pair, if said circuits 25 and 26 are separated from each other and D.C. coupled with each other only via the photo-sensitive body. The supply sources 8*a* and 8*b* and the impedances 9*a* and 9*b*, if any, are chosen so that the voltage differences between the electrodes are substantially equal to each other. The supply sources are preferably substantially identical and the impedances are inversely proportional to the currents passing through the circuits and adapted to the internal resistance of the body in the two circuits.

The two supply sources 8*a* and 8*b*, shown in FIG. 2 in the form of direct-voltage sources, are included in the two circuits 25 and 26 in accordance with their functions so that the injecting electrodes (2, 5) and (3, 6) are driven in the forward direction and the collecting electrodes (20, 21) and (22, 23) are driven, in accordance with their functions, in the reverse direction. To this end the n-type injecting electrode (2, 5) and the p-type collecting electrode (20, 21) on one side of the intermediate region 4 are connected to the negative terminals of the batteries 8*a* and 8*b* whereas the p-type injecting electrode (3, 6) and the n-type collecting electrode (22, 23) on the other side of the intermediate region 4 are connected to the positive terminals of the batteries 8*a* and 8*b*. The batteries 8*a* and 8*b* thus produce a voltage difference across the intermediate region 4, which difference corresponds to an electric field in the direction of the arrow 27, which conducts the holes 12 in the direction of the injecting electrode (3, 6) towards the collecting electrode (20, 21) and the electrons 10 in the direction of the injecting electrode (2, 5) towards the collecting electrode (22, 23).

An electrode which is suitable for injecting mainly only charge carriers of a given type, for example electrons, is, in general, at the same time an electrode which is suitable for collecting mainly only charge carriers of the same type. For instance a hole-injecting electrode (3, 6) and a hole-collecting electrode (20, 21) may both be formed by a p-type electrode. The difference between the functions becomes manifest only in the mode of connection, since an injecting electrode is driven in the forward direction and a collecting electrode is driven in the reverse direction. With an embodiment as shown in FIG. 2 it is therefore advantageous for certain uses to provide substantially identical electrodes injecting a given type of charge carriers and electrodes collecting charge carriers of the same type for the various pairs, so that they may interchange their functions in the arrangement. This means, in addition, that such an embodiment of the photo-sensitive circuit element of FIG. 2 is also suitable for alternating-voltage operation, to which end the supply sources 8*a* and 8*b* must be replaced by alternating-voltage sources having substantially the same phase and amplitude. For one half period of the alternating voltage the electrodes (2, 5) and (3, 6) operate as injecting electrodes and the electrodes (20, 21) and (22, 23) operate as collecting electrodes, whereas for the other half period the collecting function and the injecting function are interchanged.

In the circuits 25 and 26 are furthermore included the impedances 9*a* and 9*b*, which may be formed by resistors or, in the case of alternating voltage, by capacitative or inductive elements. The impedances 9*a* and 9*b* are preferably inversely proportional to the currents passing through the circuits 25 and 26. The current passing through the intermediate region 4 is then subdivided in accordance with the ratio between the contributions to current in the circuits 25 and 26. They may appear differences between the current contributions in the two circuits owing to difference in quality of the electrodes intended for holes and the electrodes intended for electrons or owing to a difference in mobility and lifetime of holes and electrons or owing to deviation due to extrinsic conduction in the intermediate region 4.

One impedance or both impedances 9*a* and 9*b*, as in the embodiment shown in FIG. 1 may be a measuring instrument, a further circuit element, for example a relay, or the like. If only in one of the two circuits impedances 9*a* and 9*b* are used to this end, it is yet desirable to include in the other circuit a matching substitute impedance in order not to disturb the correct ratio between the hole conduction and the electron conduction in the intermediate region.

Figure 3:
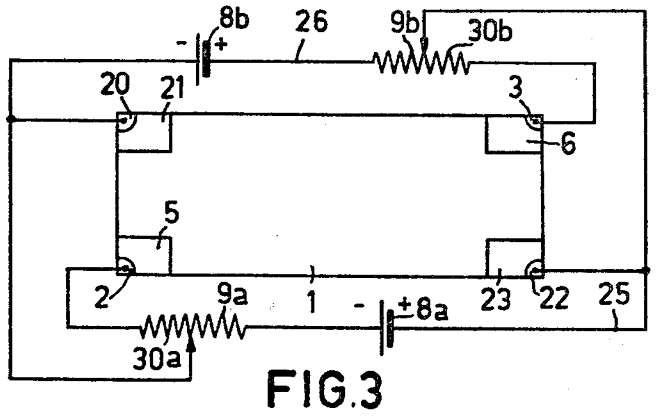
FIGS. 3 to 5 show diagrammatically various modes of connection according to the invention for the photo-sensitive semi-conductor device shown in FIG. 2.

FIG. 3 shows diagrammatically a photo-sensitive semi-conductor device according to the invention, in which the photo-sensitive circuit element is constructed in the same manner as shown in FIG. 2; it differs from the embodiment shown in FIG. 2 only in the mode of connection. The two circuits 25 and 26, in contrast to the arrangement of FIG. 2, are coupled not only via the photo-sensitive body 1, but also with each other, since the voltage across a portion 30*a* of one impedance 9*a* is fed back between one pair of electrodes (2, 5) and (20, 21) and the voltage across a portion 30*b* of the other impedance 9*b* is fed back between the other pair of electrodes (3, 6) and (22, 23) in order to maintain the said voltage difference, which is preferably substantially equal to the floating potential difference produced by the radiation between the electrodes of each of the two electrode pairs. FIG. 3 shows therefore a variant of the embodiment of FIG. 2, which variant includes an additional direct coupling between the two circuits.

The embodiment shown in FIG. 3 comprises two parallel circuits 25 and 26. By partly combining these parallel circuits a particularly simple embodiment may be obtained; this is shown diagrammatically in FIG. 4, where only one supply source 8 and one load impedance 9 are provided. With the photo-sensitive semi-conductor device shown in FIG. 4 the electrodes of each pair are connected to this end to the common supply source 8 and to the load impedance 9, while the connecting path of at least one of the electrodes of each pair (in FIG. 4, for example, the electrodes (2, 3) and (20, 21)) includes an auxiliary impedance 30*a* or 30*b*, by means of which the said voltage difference, which is preferably substantially equal to the floating potential difference at the given radiation, is applied between the electrodes of each pair. Since the floating potential difference between an injecting electrode and a collecting electrode can at the most be of the order of 1 to 2 v., the series impedances 30*a* and 30*b* bring about only a low loss of energy with respect to the overall voltage across the intermediate region, which may be 20 to 30 v. or more, in accordance with the thickness of the intermediate region. As compared with the embodiment shown in FIG. 2, the present embodiment has therefore the advantage of a partially common external circuit; but the embodiment shown in FIG. 2 has the advantage that, owing to the separate external circuits, the best floating potential automatically adjusts itself, in accordance with the radiation intensity, to the correct value, whereas in the embodiment shown in FIG. 4 at least in direct-voltage operation, particularly in the case of a varying radiation intensity, the adjustment can be carried out only to a floating potential difference which corresponds to a mean radiation intensity.

Figure 4:
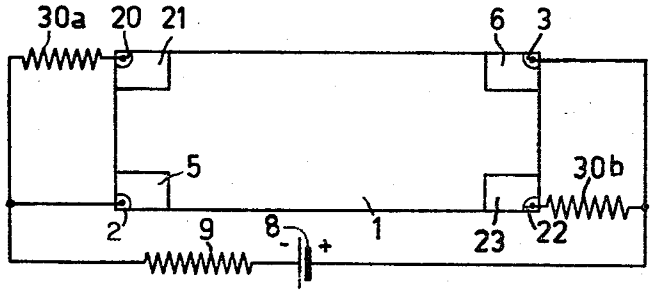

In the embodiment shown in FIG. 4 there is included a direct-voltage source 8 and in order to maintain, in direct-voltage operation, the voltage difference of the correct polarity between the electrodes of each pair, the auxiliary impedances are preferably included in the form of resistors 30*a* and 30*b* respectively in the connecting paths, towards the collecting electrodes (20, 21) and (22, 23).

Figure 5:
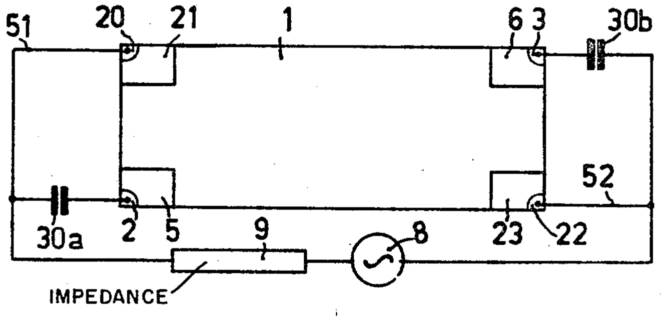

From FIG. 5 it will be seen that a similar embodiment is also suitable for alternating-voltage operation, in which case the auxiliary impedances may advantageously be formed by separation capacitors 30*a* and 30*b*, while the common supply source 8 consists of an alternating-voltage source. The separation capacitors 30*a* and 30*b* constitute an efficient separation for the direct voltage between the injecting electrode and the collecting electrode of each pair, so that in accordance with the radiation intensity the floating potential difference between said electrodes can adjust itself automatically, while on the other hand they do not constitute a hindrance for the supplied alternating voltage, so that in one half period the electrode (2, 5) and the electrode (3, 6) will inject electrons and holes respectively and the electrodes (20, 21) and (22, 23) will collect holes and electrons respectively, whereas in the other half period the injecting and the collecting functions are inverted. FIG. 5 shows by way of example that the separation capacitors 30*a* and 30*b* are included in the connections towards the injecting electrodes (2, 5) and (3, 6) but with the same effect separation capacitors may be included instead or simultaneously in the connections 51 and 52. With a particular embodiment of the photo-sensitive circuit element according to the invention, suitable for use with alternating voltage, the separation capacitors are integral with the photo-sensitive body, since with at least one of the electrodes of each pair the contact (for example 2 and 3) is connected capacitatively, for example with the interposition of an insulating layer, to the body zone associated with the electrode. Instead of resistors or separation capacitors, use may be made of voltage-dependent resistors or diodes for the separation. It will furthermore be obvious that, in the case of alternating-voltage operation, inductors may be used in the external circuit, which inductors may, if desired, couple the currents in the two circuits with the correct ratio.

In the preceding embodiments the injecting electrode is always connected in the external circuit to the collecting electrode for charge carriers of the same type. In certain cases, for example, when the electron conduction and the hole conduction are substantially equal to each other, or have only a little difference, it is also possible to use two external circuits, one being connected, with a supply source, between the injecting electrodes (2, 5) and (3, 6) of the two electrode pairs and the other being connected with a supply source between the collecting electrodes (20, 21) and (22, 23) of the two pairs, said circuits being directly coupled with each other via the photo-sensitive body. In one circuit an optimum injection and in the other circuit an optimum collection can be adjusted.

It should be noted that even with a voltage difference lying beyond the indicated range, for example in the case of a short-circuit between the electrodes of each pair, different advantages, for example an improvement in the current-voltage characteristic curve, current amplification and the like, as compared with the known devices, can be achieved, so that such a device with short-circuited electrodes in each pair may also be used advantageously both for direct voltage and for alternating voltage. When maintaining the voltage difference, preferably substantially equal to the floating potential difference, a further decrease in dark current, a further reduction of the distance between the electrode pairs and an improved linearity are obtainable with still higher voltage differences.

Figure 6:
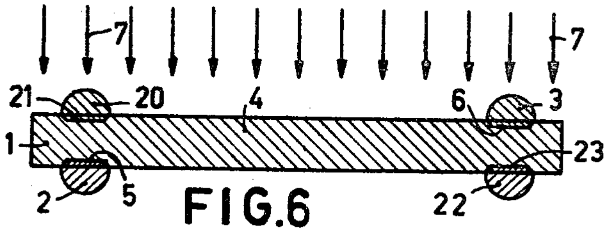
FIG. 6 shows a sectional view an embodiment of a photo-sensitive circuit element according to the invention.
Figure 7:
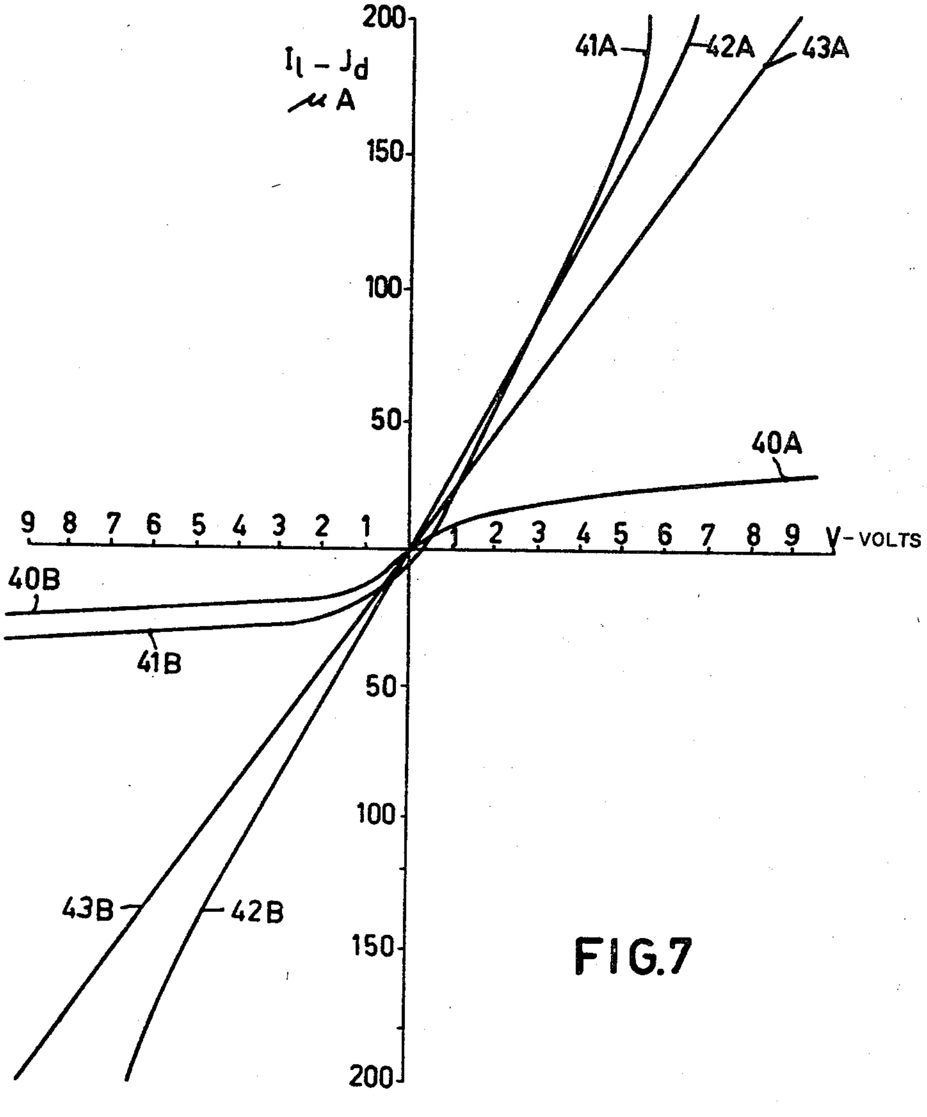
FIGS. 7 and 8 are graphs of the measuring results obtained from the photo-sensitive circuit element shown in FIG. 6.
Figure 8:
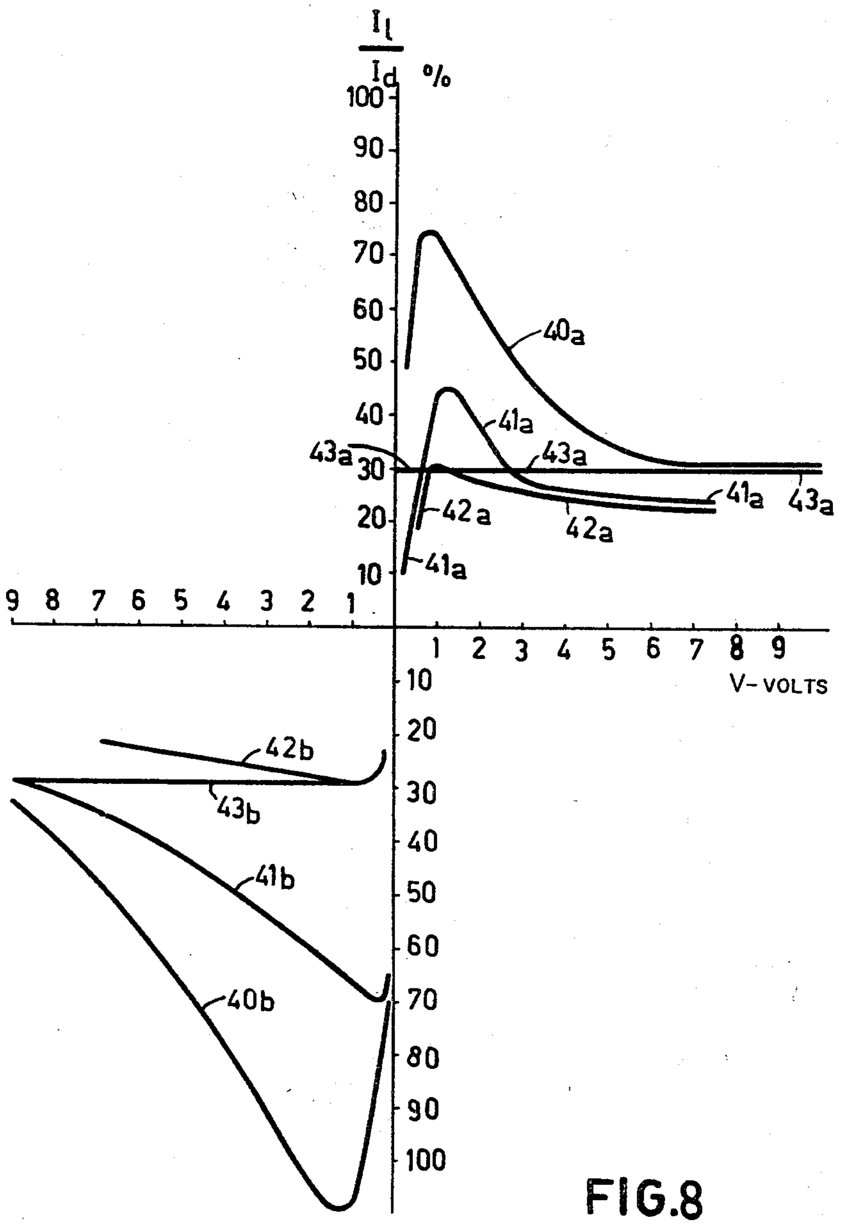

With reference to FIGS. 6 to 8, the measuring results obtained on an embodiment shown in FIG. 6 of a circuit element according to the invention will now be explaied more fully.

With the photo-sensitive circuit element shown in a diagrammatic sectional view in FIG. 6 the photo-sensitive body 1 consists of low p-conducting monocrystalline germanium having a resistivity of about 20 ohms cm., which corresponds, at 18° C. in the absence of exposure, to a predominant hole concentration of about $2.10^{14}/\text{cm.}^3$. The body is formed by a strip having a cross-section of about 1 mm. x 0.2 mm. and a length of about 15 mm. To the ends of the sides of 1 mm. of the strip 2 are alloyed two pairs of electrodes. On the upper side there are provided two p-type electrodes, formed by the contacts 20 and 3, consisting of Pb-Ga (0.5% by weight of Ga) and the associated recrystallized p-type zones 21 and 6 respectively, having a thickness of about 4$\mu$ and a Ga-concentration (and a corresponding hole concentration) of about $10^{20}$/cm.$^3$. On the lower side, opposite the first-mentioned p-type electrodes (20, 21) and (3, 6), there are provided two n-type electrodes, formed by the contacts 2 and 22 respectively, consisting of a lead-antimony alloy (2% by weight of Sb) and the associated, recrystallized n-type zones 5 and 23 respectively, having a thickness of 4$\mu$ and an antimony concentration (and a corresponding electron concentration) of about $10^{19}$/cm.$^3$.

Owing to their high hole or electron concentration the p-type electrodes (20, 21) and (3, 6) and the n-type electrodes (2, 5) and (22, 23) are specifically suitable for injecting and collecting holes and electrons respectively; the n-type electrodes, as well as the p-type electrodes, have substantially the same structure, so that with regard to their injecting function and their collecting function they may be interchanged. The electrodes are obtained by fusing the corresponding alloys in the form of a pellet with a diameter of about 250$\mu$ to the body 1 at a temperature of about 700° C. for 5 minutes in a hydrogen atmosphere.

The mobility $\mu$ of the holes and the electrons respectively amounts in this germanium to about 1800 cm.$^2$/v. sec. and 3600 cm.$^2$/v. sec. respectively. Since germanium has a fairly small band gap of about 0.72 e.v., it is particularly sensitive to infrared radiation of a wavelength of for example 1.8$\mu$, with which a substantially identical electron and hole concentration is released, so that the hole conduction and the electron conduction have substantially the same magnitude. The magnitude of a diffusion-recombination length, with a lifetime of about $10^{-4}$ sec. amounts to about 1 mm. in the intermediate region 4, so that the distance between the electrode zones of each pair is about 0.2 diffusion-recombination lengths, whereas the distance between the electrode pairs is approximately 13 mms., which corresponds to about 13 diffusion-recombination lengths.

The photo-sensitive circuit element shown in FIG. 6 was subjected at room temperature (about 18° C.) to different measurements in different modes of connection, the photo-sensitive body being measured alternately in darkness and with exposure to an infrared radiation source formed by a tungsten band lamp having a colour temperature of 2800° K., in front of which an interference filter having a maximum transmission of about 10% for 1.8$\mu$ and a pass width of 0.1$\mu$ was arranged. The radiation struck the whole upper side of the body with a substantially uniform radiation intensity of about 1.65 mw./cm.$^2$, which resulted in an excitation of about 1 mw./cm.$^2$, corrected for reflection from the germanium surface.

The measuring results are shown graphically in the associated FIGS. 7 and 8. In both FIGS. 7 and 8 the voltage in volts between the electrodes for the two polarities is plotted on the abscissa; in FIG. 7 is plotted on the ordinate the current intensity $I_l$ minus the current intensity $I_d$ in darkness in $\mu$ ampere occurring during exposure and in FIG. 8 is plotted on the ordinate the ratio $I_l$:$I_d$ in percent.

The various characteristic curves relates to a correspondingly different mode of connection. FIG. 7 provides data of the net photo current $I_l$—$I_d$ as a function of the voltage between the electrodes and FIG. 8 provides information about the course of the ratio between the photo-current and the dark current $I_l$:$I_d$. The characteristic curves of FIGS. 7 and 8 associated with each other for a given mode of connection are designated by the same reference numeral and index, the character in FIG. 7 being a capital (for example A) and in FIG. 8 the corresponding small letter (*a*).

The characteristic curves 41A of FIG. 7 and 41*a* of FIG. 8 relate to a measurement in which the circuit element of FIG. 6 according to the invention was used in the manner described with reference to FIG. 1. To this end the measurement was carried out only between the n-type electrode (2, 5) and the p-type electrode (3, 6), whereas the electrodes (20, 21) and (22, 23) were not employed. Between these electrodes a voltage difference was applied, while the negative terminal of the battery was connected to the n-type electrode (2, 5) and the positive terminal to the p-type electrode (3, 6) so that the two electrodes were polarised in the injection direction. It will be seen from the course of the characteristic curve 41A that the current-voltage characteristic curve remains substantially linear, while $I_l$—$I_d$ increases linearly with the voltage V, which means, in addition, that, since the radiation intensity is constant, the energy amplification and the current amplification increase substantially linearly with the voltage. In FIG. 8 the curve 41*a* illustrates the course of the ratio $I_l$:$I_d$ under the same conditions.

By way of comparison FIGS. 7 and 8 also show the curves 41B and 41*b*, which relates to the same mode of connection as the curves 41A and 41*a*, the essential difference being, however, that the terminals of the battery are interchanged, so that the electrodes (2, 5) and (3, 6) are connected in the reverse direction in the manner for the known photo-diodes, so that the supply via the electrodes is hindered. The curve 41B shows therefore already at 1 v. a saturation in the course similarly to the known photo-diode and the net photo-current ($I_l$—$I_d$) increases only very little above about 1 v., since the current amplification factor cannot exceed about 1 owing to the hindered supply. According to the curve 41*b* of FIG. 8 the ratio of $I_l$:$I_d$ is more favourable, it is true, than the characteristic curve 41*a*, though the curve 41*b* varies more strongly in the voltage range concerned, but it is apparent from a comparison of the curves 41A and 41B that the device according to the invention provides a great improvement in linearity and current amplification and energy amplification. In fact, the ratio between the current intensities of the curves 41A and 41B with the same voltage is substantially equal to the current amplification factor, at least in the range exceeding about 1 v. The current gain, which also increases substantially linearly with the applied voltage, is about 1 at about 0.5 volt. Above this value, for instance at about 7 volts it is considerably higher than 1, as can be derived from the drawing.

The characteristic curves 42A and 42B of FIG. 7 and 42*a* and 42*b* of FIG. 8 relate to a device according to the invention, in which the circuit element shown in FIG. 6 was measured, while the electrodes (20, 21) and (2, 5) on the one hand and the electrodes (22, 23) and (3, 6) on the other hand were short-circuited, whereas between said pairs of electrodes a voltage difference was applied and the overall current $I_l$ was measured with radiation and the current $I_d$ was measured in darkness. The characteristic curves 42A and 42B or 42*a* and 42*b* correspond to the same mode of connection with the exception of the opposite polarisation of the battery. In one direction of polarisation, the positive terminal being connected to the pair of electrodes (2, 5) and (20, 21) and the negative terminal being connected to the pair of electrodes (6, 3) and (22, 23), the electrodes (20, 21) and (22, 23) serve as hole- and electron-injecting electrodes respectively and the electrodes (2, 5) and 3, 6) serve as electron- and hole-collecting electrodes respectively, and in the opposite direction of polarisation only the injecting function and the collecting function are interchanged. Since the electron-injecting electrode and the electron-collecting electrode, as well as the hole-injecting electrode and the hole-collecting electrode, are substantially of the same structure, the characteristic curves 42A and 42B of FIG. 7 and 42*a* and 42*b* of FIG. 8 are substantially symmetrical for the two directions of polarisation. In this form the device according to the invention may be driven alternating current for the full period in an efficaceous manner. This device according to the invention, as will appear from the course of the characteristic curves 42A and 42B of FIG. 7, has for the two directions of polarisation, a favourable, substantially linear current-voltage characteristic curve, the current intensity and hence also the current amplification increasing substantially linearly with the voltage. From the characteristic curves 42*a* and 42*b* of FIG. 8 it appears, moreover, that the ratio $I_l:I_d$ in the voltage range indicated is more constant than with the characteristic curves 41*a* and 41*b*.

The characteristic curves 43A and 43B of FIG. 7 and 43*a* and 43*b* of FIG. 8 relate to a device according to the invention, in which the circuit element of FIG. 6 was used in the manner illustrated in FIG. 2. The current intensities $I_l$ and $I_d$ are the sums of the currents measured in the two external circuits as a function of the battery voltages, which were chosen equal for the two circuits. By using the two separate circuits, the floating potential difference is automatically adjusted between the electrodes of each pair, said difference being in the case concerned about 15 mv., the positive terminal being connected to the p-type electrodes. The same characteristic curves also apply to the modes of connection shown in FIGS. 3 to 5, at least when the auxiliary impedances 20 are chosen so that substantially the same floating potential difference with the correct polarity is adjusted. For these modes of connection according to the invention the course of the current-voltage characteristics curve is extremely linear, while also the current amplification is very favourable. Moreover, it has the advantage, as will appear from FIG. 8, that the characteristic curves 43*a* and 43*b* assume, in the voltage range concerned a favourable constant value $I_l/I_d$, which is also constant with high voltage differences and it is more favourable with respect to the dark current than the characteristic curves 41*a*, 42*a* and 42*b*. This device according to the invention, for example in the arrangement shown in FIG. 5, is particularly suitable for alternating-current operation.

By way of comparison FIGS. 7 and 8 show, in addition, the characteristic curves 40A and 40B and 40*a* and 40*b* respectively, the circuit element shown in FIG. 6 being measured between the two n-type electrodes (2, 5) and (22, 23), the electrodes (3, 6) and (20, 21) being left out of the circuit. With this mode of connection, which differs from the invention, since there are not used two injecting electrodes of opposite type, an unfavourable saturation current-voltage characteristic curve is found for the two directions of polarisation, exhibiting an unfavourable low current amplification, like with the characteristic curve 40B for one direction of polarisation. A similar, saturation characteristic curve is found from a measurement between the electrodes (20, 21) and (6, 6).

From the foregoing it will be seen that the characteristic curves 41A, 42A, 42B, 43A, 43B relating to the devices according to the invention distinguish favourably by a satisfactory linearity of the current-voltage characteristic curve and an advantageous increase in current amplification, while the modes of connection giving the characteristic curves 43A, 43B and 43*a* and 43*b* are to be preferred owing to their favourable dark current. It should be noted here that the ratio $I_l:I_d$ may be larger at will by using a narrower current path in the intermediate region, for example a thin layer, by using a semiconductor having a lower deviation from the intrinsic conduction or of a semiconductor having a larger band distance or by cooling to for example −70° with semiconductors having a comparatively small band distance. With the characteristic curves 41A, 42A and 42B the current intensity and the current amplification are slightly more favourable than with the curves 43A and 43B, it is true, but the course of the characteristic curves 43A and 43B is more advantageous with respect to linearity and the ratio $I_l:I_d$ is appreciably more favourable with the last-mentioned curves, particularly wtih higher voltages.

Finally, it should be noted that within the scope of the invention various modifications may be applied by those skilled in the art. For example, the shape of the photosensitive body may be different and the electrodes may be disposed relatively to each other in a different manner, for example on an at least partly annular body. Auxiliary resistors may, if desired, be incorporated in the electrode zones of the semiconductor body or the electrodes may be arranged with relative shifts in place instead of opposite each other. Instead of the auxiliary impedances, for example additional voltage sources may be connected between the electrodes of each pair in order to maintain the floating potential between said electrodes.

What is claimed is:

1. A radiation-sensitive semiconductor device, comprising a body of photosensitive semiconductive material having a region exhibiting high resistivity and selected from the group consisting of substantially intrinsic and weakly extrinsic semiconductive materials and the characteristic that, upon radiation impinging thereon, its conductivity increases, said conductivity being attributable to hole conduction and electron conduction of substantially the same order of magnitude, at least two electrodes coupled to points of said high-resistivity region spaced apart a distance of at least three diffusion-recombination lengths, one of said electrodes being an injector mainly of holes, the other of said electrodes being an injector mainly of electrons, means for applying to the said electrodes voltages which bias them, at least momentarily, in the forward direction causing the injection of holes and electrons from the respective hole and electron injecting electrodes into said high-resistivity region along a substantially common current path therein, said device being adapted to allow the incident radiation to impinge at least on the said region of high resistivity in the vicinity of the said current path, and means coupled to the electrodes for utilizing the change in conductivity resulting from the incident radiation.

2. A semiconductor device as claimed in claim 1, wherein a value of voltage is applied at which the mean transit time of the holes and electrons required for covering the current path between the electrodes is shorter than the mean recombination lifetime of said holes and electrons in the high resistivity region.

3. A semiconductor device as claimed in claim 1, wherein the photosensitive body has a p-i-n-structure with the p- and n-zones constituting, respectively, the said hole and electron injector electrodes and with the common current path located in the intrinsic region, the voltage applied to the p-zone being positive relative to the n-zone.

4. A device as set forth in claim 3 wherein the distance between the electrodes is at least 10 diffusion-recombination lengths.

5. A semiconductor device as claimed in claim 1 wherein adjacent each electrode there is provided a transitional region having a concentration of recombination centers for one of the holes and electrons.

6. A photoresistive device comprising a semiconductive body containing a region exhibiting one of intrinsic and weakly extrinsic conductivity and having comparable concentrations of free electrons and holes and possessing substantially the same order of hole and electron conduction when irradiated, first asymmetrically-conductive means for injecting predominantly holes into the said body region, second asymmetrically-conductive means for injecting predominantly electrons into the said body region, means for biasing the first and second means in the forward direction causing the injection of holes and electrons along a substantially common current path in the said body region, means enabling incident radiation to impinge upon the said body region, and an output circuit coupled to the first and second means for utilizing the increased conductivity in the said body region resulting from the impinging radiation, the holes and electrons injected into the said body region maintaining substantial electrical neutrality therein whereby the device exhibits a substantially linear current-voltage characteristic.

7. A device as claimed in claim 6 wherein there is provided adjacent one of the injecting means at least one separate collecting electrode for collecting charge carriers of the type opposite the type of charge carrier injected by the said one electrode.

8. A radiation-sensitive semiconductor device comprising a body of photosensitive semiconductive material having a region exhibiting high resistivity and the characteristic that, upon radiation impinging thereon, its conductivity increases, said conductivity being attributable to hole conduction and electron conduction of substantially the same order of magnitude, at least two injecting electrodes coupled to opposed regions of said high-resistivity region, one of said electrodes being an injector mainly of holes, the other of said electrodes being an injector mainly of electrons, means for applying to the electrodes voltages which bias them, at least momentarily, in the forward direction causing the injection of holes and electrons from the respective hole and electron injecting electrodes into the said high-resistivity region and along a substantially common current path therein, at least two collecting electrodes coupled to opposed regions of said high-resistivity region each adjacent but separated from one of the injecting electrodes and capable of collecting charge carriers of a type opposite that injected by the said adjacent injecting electrode, means for biasing the collecting electrodes with a voltage and a polarity causing the collection of said opposite type carrier, said device being adapted to allow the incident radiation to impinge at least on the said region of high resistivity in the vicinity of the said current path, and means coupled to the electrodes for utilizing the change of conductivity resulting from the incident radiation.

9. A semiconductor device as claimed in claim 8 wherein the collecting electrodes are formed by an electrode capable of collecting substantially only the charge carriers of the said opposite type.

10. A semiconductor device as claimed in claim 8 wherein the hole-injecting electrode and the hole-collecting electrode are each formed by a p-type conducting zone with an associated contact, and the electron-injecting electrode and the electron-collecting electrode are each formed by an n-type conducting zone with an associated contact.

11. A semiconductor device as claimed in claim 8 wherein each injecting electrode and the adjacent collecting electrode are spaced apart from each other by a distance along a direction perpendicular to the current path of at the most 5 diffusion-recombination lengths.

12. A radiation-sensitive semiconductor device comprising a body of photosensitive semi-conductive material having a region exhibiting high resistivity, a given energy gap between its valence and conduction bands, and the characteristic that, upon radiation impinging thereon, its conductivity increases, said conductivity being attributable to hole conduction and electron conduction of substantially the same order of magnitude, at least two pairs of electrodes coupled to opposed points of said high resistivity region, an electrode of one of said pairs being an injector mainly of holes and the other electrode of the said pair being a collector mainly of electrons, an electrode of the other of said pairs being an injector mainly of electrons and the other electrode of the said pair being a collector mainly of holes, means for applying to the injecting electrodes voltages which bias them, at least momentarily, in the forward direction causing the injection of holes and electrons from the respective hole and electron injecting electrodes into the said high-resistivity region and along a substantially common current path therein, means for applying to the collecting electrodes voltages which bias them in the reverse direction, said device being adapted to allow the incident radiation to impinge at least on the said region of high resistivity in the vicinity of the said current path, means coupled to the electrodes for utilizing the change of conductivity resulting from the incident radiation, said radiation incident on the body establishing a floating potential difference between the electrodes of each pair, and means for maintaining by means of an external circuit a voltage difference between the electrodes of each pair having a polarity the same as that of the floating potential and a magnitude between half the floating potential and the voltage value said energy gap.

13. A device as set forth in claim 12 wherein the voltage difference maintained between the electrodes of each pair is substantially equal to the floating potential.

14. A semiconductor device as claimed in claim 12 wherein two external circuits are provided, one including a voltage source and being connected between the electron-injecting electrode of one pair and the electron-collecting electrode of the other pair, and the other circuit including a substantially identical voltage source and being connected between the hole-collecting electrode of said one pair and the hole-injecting electrode of said other pair, said two circuits being coupled with each other via the photosensitive body.

15. A semiconductor device as claimed in claim 12 wherein the electrodes of each pair are connected to a common voltage source and a common load impedance, and the coupling means between at least one of the electrodes of each pair includes an additional auxiliary impedance having a value maintaining the said voltage difference between the electrodes of each pair.

16. A semiconductor device as claimed in claim 15 wherein the common voltage source is a direct-voltage source, and auxiliary impedances are provided in the form of resistors in the coupling to the collecting electrode of each pair.

17. A semiconductor device as claimed in claim 15 wherein the common voltage source is an alternating-voltage source, and the auxiliary impedances are formed by capacitors.

18. A photoresistor comprising a semiconductive body containing a region exhibiting one of intrinsic and weakly extrinsic conductivity and having comparable concentrations of electrons and holes and possessing substantially the same order of hole and electron conduction when irradiated, first asymmetrically-conducting means for injecting mainly holes into the said body region, second asymmertically-conducting means for injecting mainly electrons into said body region, said injected holes and electrons following a substantially common current path in the said body region, said hole and electron injecting means being separated by a distance measured along said common current path of at least 10 diffusion-recombination lengths.

19. A photoresistor comprising a semiconductive body containing a region exhibiting one of intrinsic and weakly extrinsic conductivity and possessing substantially the same order of hole and electron conduction when irradiated, a first pair of electrodes including an electrode for injecting mainly holes into the said body region and an electrode for collecting electrons from the said body region, a second pair of electrodes including an electrode for injecting mainly electrons into the said body region and an electrode for collecting holes from the said body region, said injected holes and electrons following a substantially common current path in the said body region, the distance, measured along the current path between the two electrode pairs, being at least 3 diffusion-recombination lengths, the injecting electrode and the collecting electrode of each pair being spaced apart along a direction perpendicular to the current path by a distance of at the most 5 diffusion-recombination lengths.

20. A photo-resistor as claimed in claim 19 wherein the hole-injecting electrode and the hole-collecting electrode each include a p-type zone, and the electron-injecting electrode and the electron-collecting electrode each include an n-type zone.

References Cited

UNITED STATES PATENTS

| | | | |
|---|---|---|---|
| 2,794,863 | 6/1957 | Van Roosbroeck | 317—235.27 |
| 2,962,605 | 11/1960 | Grosvalet | 250—211 X |
| 2,986,591 | 5/1961 | Swanson et al. | 250—211 X |
| 3,015,770 | 1/1962 | Van Santen et al. | 250—211 X |
| 3,040,262 | 6/1962 | Pearson | 317—235 |

OTHER REFERENCES

Stafeev, V. I.: Modulation of Diffusion Length as a Principle of Operation of Semiconductor Devices; Soviet Physics Solid State; vol. 1; No. 1–6; Dec. 1959, pp. 763–768.

WALTER STOLWEIN, *Primary Examiner.*

RALPH G. NILSON, *Examiner.*